United States Patent [19]
Otake

[11] Patent Number: 5,691,632
[45] Date of Patent: Nov. 25, 1997

[54] SWITCHING POWER SUPPLY

[75] Inventor: Tetushi Otake, Tokyo, Japan

[73] Assignee: Toko, Inc., Tokyo, Japan

[21] Appl. No.: 651,761

[22] Filed: May 22, 1996

[30]    Foreign Application Priority Data

May 26, 1995  [JP]  Japan .................................... 5-152700
Oct. 13, 1995  [JP]  Japan .................................... 5-290548

[51] Int. Cl.$^6$ ...................................................... G05F 1/46
[52] U.S. Cl. ......................................... 323/282; 323/222
[58] Field of Search ................................. 323/222, 266, 323/282, 284; 363/89, 127

[56]              References Cited

U.S. PATENT DOCUMENTS 4,546,304  10/1985  Schwarz ................................. 323/287
5,396,412   3/1995  Barlage .................................. 363/89
5,477,131  12/1995  Gegner .................................. 323/222
5,552,695   9/1996  Schwartz ............................... 323/271

FOREIGN PATENT DOCUMENTS 3-78463   4/1991  Japan .
7-143739  11/1993  Japan .

Primary Examiner—Adolf Berhane
Attorney, Agent, or Firm—Frishauf, Holtz, Goodman, Langer & Chick, P.C.

[57]              ABSTRACT

A switching power supply in which high efficiency is obtained by further reducing a loss occurring in a PNP type transistor as a rectifying element, particularly in case of making a switching frequency higher. Further, the switching power supply is a boost/buck converter in which an application range of an input voltage is broadened by causing a circuit not to perform intermittent operation when the voltage $V_{IN}$ is higher than an output voltage $V_o$. One end of a choke coil L1 is connected to an input terminal 1 and another end thereof is connected to an emitter of a PNP type transistor Q2 as a rectifying element. A base of transistor Q2 is connected to a collector of a driving transistor Q3 via a resistor R4. The base of the driving transistor Q3 is connected to another end of the choke coil L1 via a series circuit of a capacitor C3 and a resistor R3. Further, the base of the transistor Q2 is connected to one end of the input terminal side of the choke coil via an auxiliary bias circuit 4 or an impedance circuit 5.

9 Claims, 2 Drawing Sheets

SWITCHING POWER SUPPLY

BACKGROUND OF THE INVENTION

1. Field of the Invention

The present invention relates generally to a switching power supply adapted to a synchronous rectification system using a transistor as a rectifying element, and more particularly to technologies for improving efficiencies and expanding an application range of an input voltage of the switching power supply functioning as a buck/boost converter by the transistor as the rectifying element.

2. Description of the Prior Art

There is a circuit used a transistor instead of a diode as a rectifying element disposed in a switching power supply as one means for improving a power conversion efficiency thereof. In this case, it is required to perform ON and OFF operation for the transistor, synchronizing with operation of a switching element in that circuit. Thus, rectifying means is also referred to synchronous rectification. For this synchronous rectification, many circuits for synchronous operation have been proposed.

As one example of the switching power supply applied to the synchronous rectification system, the inventor of this application has proposed the switching power supply having a circuit structure as shown in FIG. 1.

In brief explanation, the following operation of the circuit shown in FIG. 1 is provided.

A stepped voltage having two high-and-low level values generates in a connection point (a) to which a choke coil L1, a collector of a switching transistor Q1 and an emitter of a switching transistor Q2 are connected, respectively, by ON and OFF operation of the switching transistor Q1, wherein a high level of the stepped voltage is a voltage value that an input voltage $V_{IN}$ and a flyback voltage generated in the choke coil L1 are added, and a low level thereof is ground potential (voltage). Only an A.C. component of the stepped voltage is inputted to a base of a driving transistor Q3 by means of a capacitor C3.

In case that the input voltage $V_{IN}$ is lower than an output voltage $V_o$ to be obtained, the driving transistor Q3 performs complementally ON and OFF operation with operation of the switching transistor Q1 in accordance with a change of a voltage appearing at the connection point (a). Consequently, base current of the transistor Q2 flows in accordance with the ON and OFF operation of the driving transistor Q3, and the transistor Q2 reaches an ON or OFF state to rectify the voltage appearing at the connection point (a). In other words, the transistor Q2 at this time operates as a rectifying element like a diode, and thus, the circuit as illustrated in FIG. 1 will be a boost converter.

On the contrary, in case that the input voltage $V_{IN}$ is higher than the output voltage $V_o$ to be obtained, the driving transistor Q3 repeats a non-conductive state (an OFF state) and a conductive state having electric resistance between a collector and an emitter thereof, complementing the operation of switching transistor Q1. The reason that the driving transistor Q3 does not go to an ON state but the conductive state having the electric resistance between the collector and emitter thereof will be described below. It is because when the input voltage $V_{IN}$ is higher than an output voltage $V_o$ to be obtained, an on-duty of the switching transistor Q1 becomes small, and a voltage signal forward biasing the driving transistor Q3, which is inputted to the base of the driving transistor Q3 through the capacitor C3 becomes small.

At this time, the amount of current flowing into the collector of the driving transistor Q3 is determined approximately by the on-duty of the switching transistor Q1. The base current of the transistor Q2 is controlled by the driving transistor Q3, and the transistor Q2 repeats the OFF state and the conductive state having electric resistance between a collector and an emitter thereof in accordance with operation of the driving transistor Q3. Consequently, the transistor Q2 causes a voltage to drop by the electric resistance between its collector and emitter during the OFF state of the switching transistor Q1 and controls the passing amount of energy. In other words, at this time the transistor Q2 operates as a voltage control element such as a series regulator, and the circuit shown in FIG. 1 acts as a buck converter.

Like this, the circuit shown in FIG. 1 functions as a buck/boost converter by reason that the transistor Q2 performs the rectifying operation or the voltage control operation. Important items in performance of the buck/boost converter are the conversion efficiency and application range of the input voltage, but with regard to the conversion efficiency and an application range of the input voltage in the circuit shown in FIG. 1, there is room for further improvement as mentioned below.

Further improvement of the power conversion efficiency of the switching power supply can be expected by using a transistor instead of a diode as a rectifying element. However, the transistor element is required to do an ON and OFF control, and as is well known, with regard to operation of the transistor, there exists a delay time (a storage time) caused by storage and disappearance of charges in its base region. Almost all of the losses at time of the ON and OFF operation of the transistor element will occur by the voltage appearing between the collector and emitter of the transistor element and the current flowing thereto within the delay time of this operation. Naturally, the losses increase as the delay time is long.

In the switching power supply shown in FIG. 1, in order to reduce the losses caused in the transistor Q2, a capacitor C4 for speedup is connected in parallel to a resistor R4 for setting base current and in addition, a series circuit of a capacitor C5 and a resistor R5 is connected between the base of the transistor Q2 and the ground, wherein the series circuit of the capacitor C5 and the resistor R5 causes the a speed of turn-on operation to improve by drawing in the base current of transistor Q2 at time of the turn-on thereof. Further, it causes a speed of turn-off operation to improve by forming a discharge path of the storage charges in the base region of transistor Q2 to accelerate the disappearance of the storage charges at time of the turn-off of the transistor Q2. Explanation regarding function of the capacitor C4 for speedup, which is genenral, is omitted.

However, the capacitor C4 and the series circuit of capacitor C5 and resistor R5 act passively on the base current of the transistor Q2. For this, it is impossible to shorten greatly an operation delay time of transistor Q2. Consequently, when causing switching frequencies of switching transistor Q1 to be high in the switching power supply structured as shown in FIG. 1, the losses occurring in transistor Q2 increase and become larger than that occurring in the diode.

In addition, when further raising input voltage $V_{IN}$ of the circuit as shown in FIG. 1, a control circuit ("C.C.") 3 causes on-duty of the switching transistor Q1 to be small to suppress rise of the output voltage $V_o$. In an actual circuit, however, it is impossible to make the on-duty less than a certain value by reasons of the operation delay time of switching transistor Q1 and other causes. Thus, since the on-duty of switching transistor Q1 does not become small even if the input voltage $V_{IN}$ rises, A.C. component of the stepped voltage inputted to the base of driving transistor Q3 becomes large, and soon the driving transistor Q3 leads current than necessary to its collector. Consequently, at certain time, excessive current flows into the base of the transistor Q2, the resistance between the collector and emitter of the transistor Q2 becomes small, and thus, the output voltage $V_o$ rises.

The control circuit 3 that detects the rise of its output voltage $V_o$ stops operation by reducing the on-duty of the switching transistor Q1 to zero and continues to stop the operation until the output voltage $V_o$ drops to a normal level. Shortly, when the output voltage $V_o$ reaches the normal level, the control circuit 3 supplies a driving signal again, thereby the switching transistor Q1 resumes the ON and OFF operation. However, the output voltage $V_o$ rises by reason that the switching transistor Q1 performs the ON and OFF operation and the control circuit 3 stops its operation again. Like this, an intermittent state occurs in which both the control circuit 3 and the switching circuit Q1 repeat periodically start and stop of the operation are forced upon the circuit.

The input voltage $V_{IN}$ just prior to occurence of the intermittent operation comes to an actual upper limit value of the application range of the input voltage in the switching transistor as shown in FIG. 1 because in the intermittent state, a ripple appearing in the output voltage $V_o$ becomes large.

SUMMARY OF THE INVENTION

A first object of the present invention is to reduce losses occurring in a transistor by performing rapidly storage or disappearance of charges in a base region of the transistor in a switching power supply using a PNP transistor as a rectifying element and to obtain a high power conversion efficiency even if switching frequencies become higher.

A second object of the present invention is to expand an application range of an input voltage by suppressing intermittent operation in the switching power supply allowing boost/buck operation by using the PNP transistor as the rectifying element.

The present invention provides a switching power supply to obtain a predetermined output voltage, for causing an inductance element to generate a flyback voltage when a switching element turns off and for rectifying a voltage in which the flyback voltage is superposed on an input voltage through a rectifying element comprising: a transistor rectifying element, which consists of a PNP type bipolar transistor, disposed between the inductance element and an output terminal, for fulfilling a rectifying function; a driving transistor, which consists of an NPN type bipolar transistor, connected between a base of the transistor rectifying element and a low potential point such as the ground, for controlling operation of the transistor rectifying element, receiving a supply of an ON and OFF control signal from a connection point of the transistor rectifying element and the inductance element; a capacitor, connected between the base of the driving transistor and a connection point of the transistor rectifying element and the inductance element, for leading the control signal to a base of the driving transistor; and an auxiliary bias circuit, one end of which is connected to a base of the transistor rectifying element, for leading forward and reverse directional bias voltages applying to the transistor rectifying element according to operation of the switching element.

Further, the present invention provides a switching power supply to obtain a predetermined output voltage, for causing an inductance element to generate a flyback voltage when a switching element turns off and for rectifying a voltage in which the flyback voltage is superposed on an input voltage through a rectifying element comprising: a transistor rectifying element, which consists of a PNP type bipolar transistor, disposed between the inductance element and an output terminal, for fulfilling a rectifying function; a driving transistor, which consists of an NPN type bipolar transistor, connected between a base of the transistor rectifying element and a low potential point such as the ground, for controlling operation of the transistor rectifying element, receiving a supply of an ON and OFF control signal from a connection point of the transistor rectifying element and the inductance element; a capacitor, connected between the base of the driving transistor and the connection point of the transistor rectifying element and the inductance element, for leading the control signal to the base of the driving transistor; and an impedance circuit connected between a base of the transistor rectifying element and one end in an input terminal side of the inductance element.

An emitter and a collector of a PNP type transistor Q2 as a rectifying element are connected between the inductance element L1 and an output terminal 2, respectively, and a base of the transistor Q2 is connected to a collector of an NPN type driving transistor Q3 through a resistor R4. An emitter of a driving transistor Q3 is connected to the ground, a base of which is connected to the emitter of the transistor Q2 through a series circuit of a resistor R3 and a capacitor C3 and to a cathode of a diode D1, an anode of which is connected to the ground.

For a rectifying circuit of a synchronous rectification system having a circuit structure mentioned above, in a first embodiment of the present invention, the auxiliary bias circuit 4 consisting of a resistor R6 and a capacitor C6 is connected between the base of the transistor Q2 and one end in the input terminal side of the choke coil L1. This auxiliary bias circuit 4 has function enhancing an operation speed of the transistor Q2 by inputting an A.C.-like voltage generating in the choke coil L1 to the base of the transistor Q2 as a bias voltage.

In a second embodiment of the present invention, the impedance circuit 5a consisting of a resistor R7 is connected to the base of the transistor Q2 and one end in the input terminal side of the choke coil L1.

In a third embodiment of the present invention, the impedance circuit 5b consisting of a series circuit of a resistor R7 and a diode D2 is connected to the base of the transistor Q2 and one end in the input terminal side of the choke coil L1.

Each of the impedance circuits 5a and 5b leads a D.C.-like voltage signal inputted to a circuit to the base of the transistor Q2, and when an input voltage becomes higher than an output voltage, an electric resistance between the collector and emitter of the transistor Q2 is increased by raising base potential thereof.

Further, in another embodiment of the present invention, a circuit for adjusting a phase shift is connected in parallel to the impedance circuits 5a and 5b connected between the base of the transistor Q2 and one end in the input terminal side of the choke coil L1.

DESCRIPTION OF THE PREFERRED EMBODIMENTS

Figure 2:
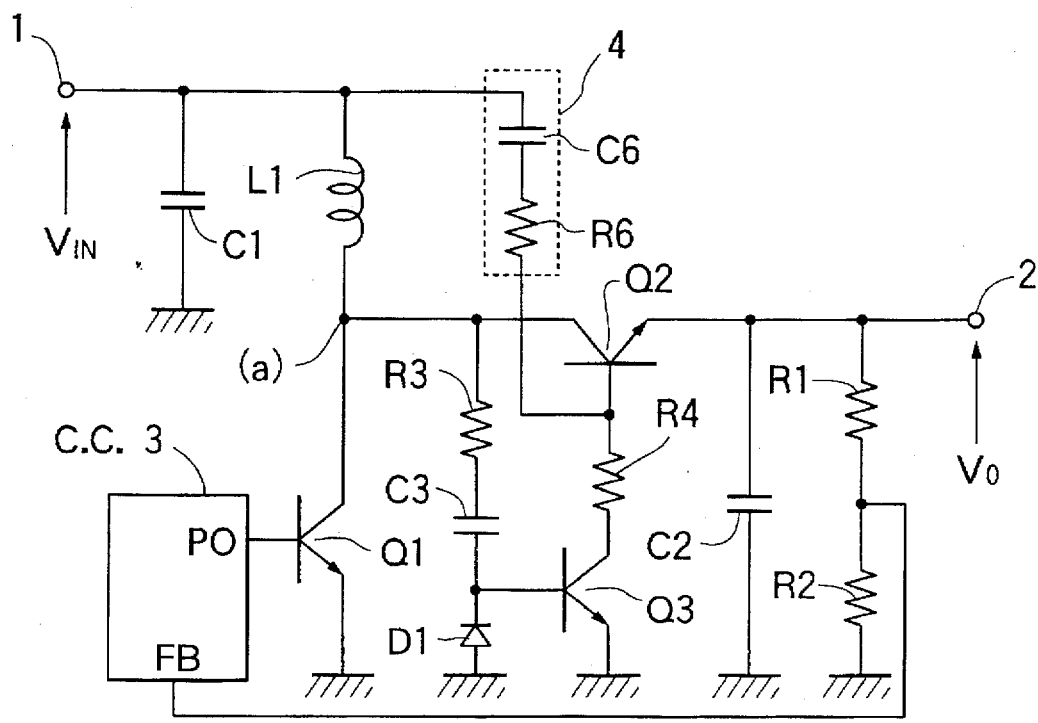
FIG. 2 is a circuit, which can improve efficiency of the circuit, in a first embodiment of the switching power supply according to the present invention.

Referring to FIG. 2, there is illustrated a circuit of the first embodiment of a switching power supply according to the present invention.

Figure 1:
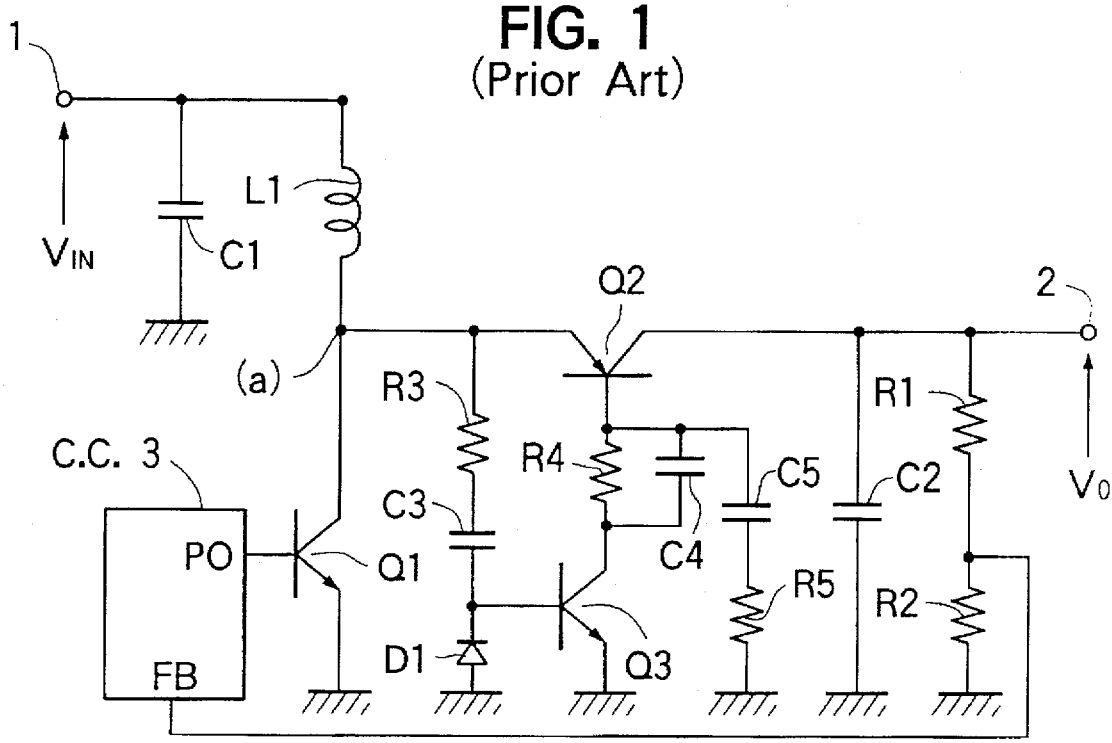
FIG. 1 is a circuit of the switching power supply proposed by an inventor of the present invention in Japanese Patent Application No. 6-15843.

It should be noted that the same structural elements in FIG. 2 as those shown in FIG. 1 are given the same reference numerals.

In FIG. 2, the switching power supply includes the following structures.

One end of a choke coil L1 is connected to an input terminal 1, and another end thereof (a connection point (a) side) is connected to a collector of an NPN type switching transistor Q1. An emitter of the switching transistor Q1 is connected to the ground, and its base is connected to a pulse output terminal P0 of a control circuit 3. In addition, another end ((a) side) of the choke coil L1 is connected to an emitter of a PNP type transistor Q2 as a rectifying element. A collector of transistor Q2 is connected to an output terminal 2, and a smoothing capacitor C2 is connected between the output terminal 2 and the ground. Further, a series circuit of resistors R1 and R2 is connected therebetween, and a connection point of the resistors R1 and R2 is connected to a output voltage detection terminal FB of the control circuit 3.

A base of the transistor Q2 is connected to a collector of an NPN type driving transistor Q3 through a resistor R4 and one end in the input terminal side of the choke coil L1 through a series circuit of a resistor R6 and a capacitor C6. The series circuit of the resistor R6 and capacitor C6 forms an auxiliary bias circuit 4.

An emitter of the driving transistor Q3 is connected to the ground, a diode D1 is connected between a base thereof and the ground, and a series circuit of a resistor R3 and a capacitor C3 is connected between the base of the driving transistor Q3 and another end ((a) side) of the choke coil L1.

In operation of the switching power supply, when the switching transistor Q1 is turned off, a flyback voltage generates in the choke coil L1 in the direction from the input terminal 1 to the connection point (a) by energy stored therein up to that time. Thereby, a voltage at the connection point (a) rises to a voltage value in which the flyback voltage is superposed on an input voltage.

The voltage at the connection point (a) is applied to the base of the driving transistor Q3 through the series circuit of resistor R3 and capacitor C3, and the driving transistor Q3 is changed to an ON state. A current path of base current of the transistor Q2 is established by reason that the driving transistor Q3 reaches the ON state.

At the same time, the flyback voltage generated in the choke coil L1 is further led by the auxiliary bias circuit 4 and a forward bias is applied between the base and emitter of the transistor Q2.

The transistor Q2 is turned on by establishment of a current path by the driving transistor Q3 and a forward bias applied by the auxiliary bias circuit 4. It this time, base current of the transistor Q2 increases and a speed of turn-on operation can be improved because the transistor Q2 receives the forward bias from the auxiliary bias circuit 4.

Next, when the switching transistor is turned on, a voltage of the connection point (a) drops to ground potential. The driving transistor Q3 is changed to an OFF state by a voltage drop of the connection point (a), and a current path of base current of the transistor Q2 is interrupted.

At the same time, a current flows through a path of the input terminal 1, the choke coil L1 and the switching transistor Q1, and a voltage is induced in the choke coil L1 in the direction of the input terminal 1 from the connection point (a) by self-induction action. This induced voltage is led by the auxiliary bias circuit 4, and a reverse bias is applied between the base and emitter of the transistor Q2.

The transistor Q2 is turned off by means of the interruption of the current path by the driving transistor Q3 and the reverse bias of the induced voltage applied by the auxiliary bias circuit 4. At this time, a speed of turn-off operation is improved because the transistor Q2 receives the reverse bias from the auxiliary bias circuit 4 to eliminate forcibly charges stored in a base region of the transistor Q2.

The switching power supply according to the present invention can improve the operation speed of the transistor Q2 by reason that the auxiliary bias circuit 4 applies the voltage generating in the choke coil L1 between the base and emitter thereof as the auxiliary bias voltage. For this, losses occurring in the transistor Q2 can be suppressed even if the switching frequency becomes higher.

In this connection, the circuits as shown in FIGS. 1 and 2 have been compared using the circuits produced experimentally. As a result, comparing the circuit as shown in FIG. 2 according to the present invention with the circuit in FIG. 1, it has been recognized that in case that the switching frequencies are about 160 kHz, there is an improvement of about 4% in a power conversion efficiency of the circuit according to the present invention, and in case of about 320 kHz, there is an improvement of about 30%.

Also, in the switching power supply according to the present invention, the capacitor C4 for speedup and the series circuit of resistor R5 and capacitor C5 used in FIG. 1 may be eliminated. Thus, the switching power supply according to the present invention has a further technical advantage that the number of the circuit elements is reduced.

Further, a coil part having a tap in the choke coil L1, to which another end of the auxiliary bias circuit 4 is connected, may be used while in the embodiment of the present invention as shown in FIG. 2, one end of the auxiliary bias circuit 4 is connected to the base of transistor Q2, and another end thereof is to one end in the input terminal side of the choke coil L1. This means that the coil part connecting a plurality of choke coils L1 may be used.

In addition, in the embodiment illustrated in FIG. 2, although the auxiliary bias circuit 4 is formed by the series circuit of resistor R6 and capacitor C6, for example, it may be formed by only a capacitor. It will be apparent for those in this field that the auxiliary bias circuit is not limited to this structure.

Figure 3:
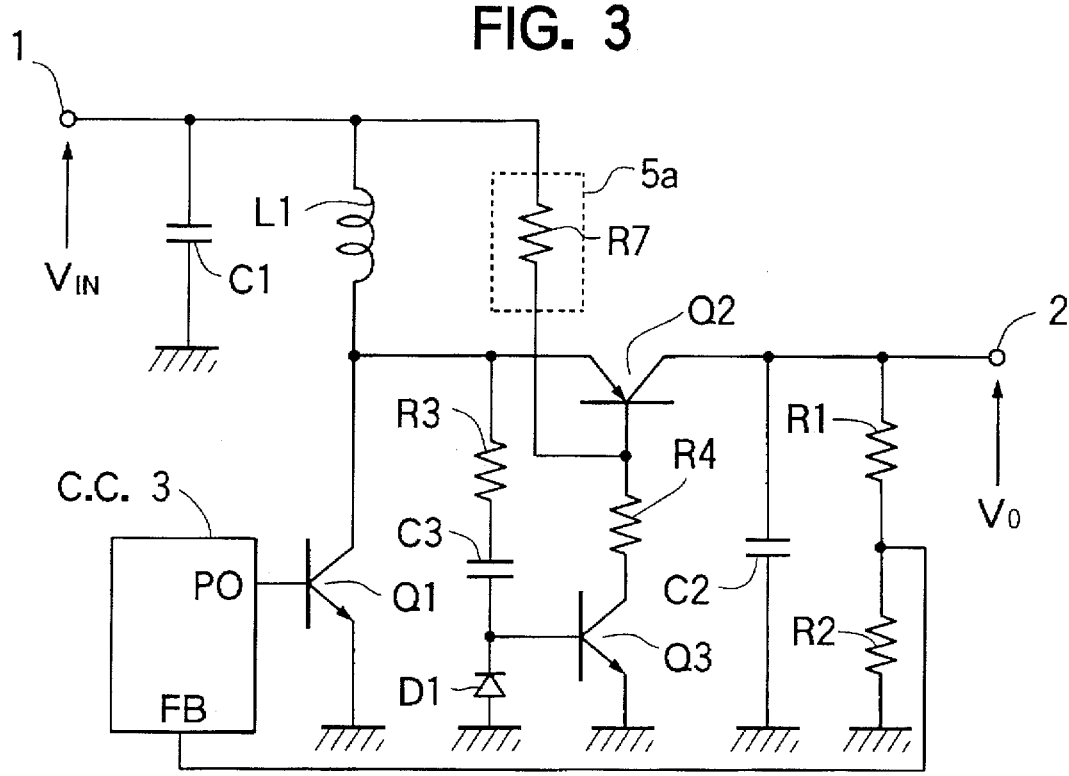
FIG. 3 is a circuit, which can expand an application range of an input voltage, in a second embodiment of the switching power supply according to the present invention.

Referring to FIG. 3, there is illustrated a second embodiment of the switching power supply according to the present invention. In FIG. 3, its circuit structure is identical to the circuit as shown in FIG. 3 except an impedance circuit 5a.

The auxiliary bias circuit 4 illustrated in FIG. 2 causes the A.C.-like voltage signal generating in the choke coil L1 to pass and leads the forward or reverse bias voltage between the base and emitter of the transistor Q2. To the contrary, the impedance circuit 5a illustrated in FIG. 3 allows the A.C.-like voltage signal as well as the D.C. voltage signal to pass. Since the D.C. voltage signal, namely the input voltage $V_{IN}$ is applied to the base of transistor Q2 through the impedance circuit 5a, operation of the circuit as shown in FIG. 3 is different in the following way from the circuit of FIG. 2.

In case that the input voltage $V_{IN}$ is higher than the output voltage $V_o$ to be obtained, the control circuit 3 makes the on-duty of the switching transistor Q1 small.

When the switching transistor Q1 is turned off, potential of the collector thereof rises to the voltage value in which the input voltage $V_{IN}$ and the flyback voltage of the choke coil L1 are superposed. However, the on-duty of the switching transistor Q1 is small so that the flyback voltage generated in the choke coil L1 is small, and actually, the collector potential of the switching transistor Q1 becomes near to a voltage value of the input voltage $V_{IN}$. Thus, the on-duty of the switching transistor Q1 is small so that a driving signal inputted to the base of the driving transistor Q3 becomes small. Consequently, the driving transistor Q3 changes to a conductive state having the electric resistance between the collector and emitter thereof, and the amount of current according to the on-duty of the switching transistor Q1 flows into its collector. Thereby, the transistor Q2 suppresses the amount of energy passing from an input side to an output side by the electric resistance between the collector and emitter since the amount of base current of the transistor Q2 is controlled by the driving transistor Q3.

At this time, since the impedance circuit 5a is connected, the input voltage $V_{IN}$ is applied to a series circuit of a resistor R7, a resistor R4 and the driving transistor Q3. Thus, base potential rises towards emitter potential of the transistor Q2 according to a voltage of a connection point of the resistors R7 and R4. For this, the electric resistance between the collector and emitter of the transistor Q2 becomes large, and the passing amount of energy is further suppressed. This is an action equivalent to a case of making the on-duty of the switching transistor Q1 small, and in an actual circuit, the control circuit 3 causes the on-duty of the switching transistor Q1 to be large to control properly the passing amount of energy.

Therefore in case of further raising the input voltage $V_{IN}$, even if the circuit illustrated in FIG. 1 has a voltage value going to an intermittent operation state, the circuit illustrated in FIG. 3 does not go to the intermittent operation state because there is a margin that an on-period of the switching transistor Q1 can be shortened. The circuit of FIG. 3 also will go to the intermittent operation state according to the input voltage $V_{IN}$ in time, but its voltage value becomes very large in comparison with the circuit of FIG. 1. It is possible therefore to expand an application range of the input voltage.

Further, operation speed of the transistor Q2 is improved because the impedance circuit 5a of FIG. 3 leads the voltage generated in the choke coil L1 to between the base and emitter of the transistor Q2 as well as the auxiliary bias circuit 4 of FIG. 2.

Since a resistance value of the resistor R7 forming the impedance circuit 5a is determined by considering only effect to suppress the intermittent operation, a design work is simple, and a period of the design is short. There are some advantages that it is unnecessary to set strictly the value of the impedance circuit 5a and for this, the scattering of parts constant have scarcely an effect on characteristics of the entire circuit.

Figure 4:
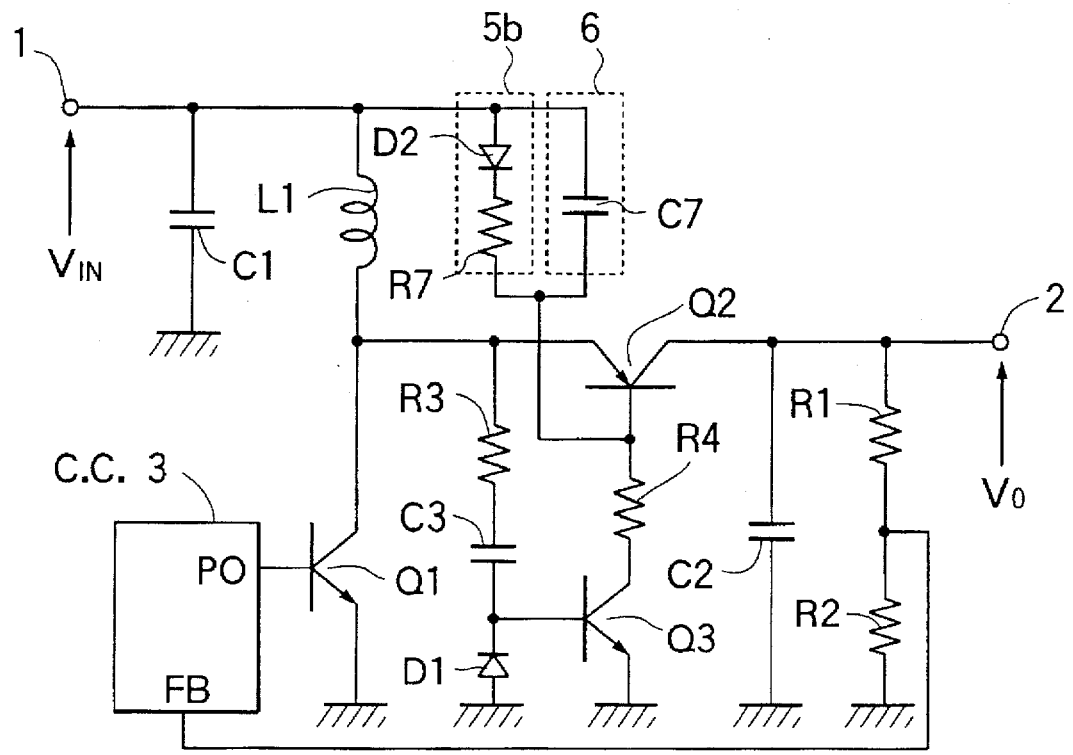
FIG. 4 is a circuit, which cannot only expand an application range of an input voltage but also improve efficiency of the circuit in a third embodiment of the switching power supply according to the present invention.

Referring to FIG. 4, there is illustrated a third embodiment of the switching power supply according to the present invention.

In the circuit illustrated in FIG. 4, an impedance circuit 5b is formed by a series circuit of a resistance R7 and a diode D2. Further, a circuit 6 for adjusting a phase shift is connected in parallel to the impedance circuit 5b, wherein with regard to the diode D2 of the impedance circuit 5b, its forward direction is a direction flowing current to a base of a transistor Q2 from an input terminal 1, and the phase shift adjusting circuit 6 is formed by a capacitor C7.

In the circuit of FIG. 3, a part of flyback energy of a choke coil L1 flows back through the impedance circuit 5a, and an energy loss occurs in the impedance circuit 5a. Thus, an object of the circuit of FIG. 4 is to prevent the flyback energy from flowing back by forming the impedance circuit 5b with the series circuit of the resistor R7 and the diode D2 and to reduce the loss generated in the impedance circuit 5b. The phase shift adjusting circuit 6 applies a signal of the flyback voltage generated in the choke coil L1 to the base of the transistor Q2 and causes improved operation speed of turn-on-and-off of the transistor Q2. This phase shift adjusting circuit 6 is a structural element essentially equal to the auxiliary bias circuit 4 of FIG. 2.

In operation of the circuit illustrated in FIG. 4, it is approximately equal to the circuit combining the circuit of FIG. 2 with the operation of FIG. 3. In other words, the impedance circuit 5b can suppress the intermittent operation by leading the input voltage $V_{IN}$ of a D.C.-like voltage signal to the base of the transistor Q2, and the phase shift adjusting circuit 6 can improve the operation speed of the transistor Q2 by leading the voltage generated in the choke coil L1 of the A.C.-like voltage signal to between the base and emitter of the transistor Q2.

Further, in the circuit of FIG. 4, the phase shift adjusting circuit 6 is formed by only the capacitor C7, but may be formed by a series circuit of a capacitor and a resistor such as the circuit as illustrated in FIG. 2. In addition, with regard to the impedance circuit 5a in the circuit of FIG. 3, the phase shift adjusting circuit 6 such as the circuit illustrated in FIG. 4 may be connected.

As described above, in the switching power supply according to the present invention, the auxiliary bias circuit or impedance circuit is connected between the base of the transistor rectifying element and one end in the input terminal side of the inductance element.

The auxiliary bias circuit applies a bias voltage (for concrete example, a voltage appearing in the choke coil) to the base of the transistor as a rectifying element. Thereby the operation speed of the transistor as the rectifying element is much improved, the loss occurring in the transistor as the rectifying element is reduced, and the power conversion efficiency of the switching power supply is improved. These effects appear remarkably when making the frequency of the switching element higher. Further, means (speedup capacitor) for improving passively the operation speed used as a prior art to improve the operation speed of the transistor is in principle unnecessary, and thus, the number of parts in circuit elements can be prevented from increasing.

When the switching power supply performs buck operation, the impedance circuit raises the base potential of the transistor rectifying element. Thereby a margin occurs in a range of change of the on-duty of the switching transistor at time of the buck operation, and it is hard to go to the intermittent operation state. As a result, it is possible to expand the application range of the input voltage of the switching power supply. Further, for determination of the parts constant of the impedance circuit, all a designer has to do is to almost consider only an action to suppress the intermittent operation, and a design work is simplified and its time is shortened. Further, it is unnecessary to set strictly the parts constant of the impedance circuit. Thereby the scattering of the parts constant have scarcely an effect on characteristics of the entire circuit.

I claim:

1. In a switching power supply to obtain a predetermined output voltage, for causing an inductance element to generate a flyback voltage when a switching element turns off and for rectifying a voltage in which the flyback voltage is superposed on an input voltage through a rectifying element, the switching power supply comprising:

a transistor rectifying element, which includes a PNP type bipolar transistor, electrically coupled between the inductance element and an output terminal, for rectifying the input voltage;

a driving transistor, which includes an NPN type bipolar transistor, electrically coupled between a base of the transistor rectifying element and a low potential point such as ground, for controlling operation of said transistor rectifying element, said driving transistor receiving a supply of an ON and OFF control signal from a connection point of the transistor rectifying element and an output side of the inductance element;

a capacitor connected between a base of the driving transistor and the connection point of the transistor rectifying element and the inductance element, for coupling the control signal to the base of the driving transistor; and an auxiliary bias circuit, connected between the base of the transistor rectifying element and an input side or intermediate terminal of the inductance element, for coupling forward and reverse directional, auxiliary bias voltages to the transistor rectifying element according to operation of the switching element.

2. The switching power supply according to claim 1, wherein the bias voltage coupled to the base of the transistor rectifying element by the auxiliary bias circuit is a voltage generated in the inductance element.

3. The switching power supply according to claim 2, wherein the auxiliary bias circuit consists of a series circuit of a resistor element and a capacitor element connected between the base of the transistor rectifying element and the input side of the inductance element.

4. In a switching power supply to obtain a predetermined output voltage, for causing an inductance element to generate a flyback voltage when a switching element turns off and for rectifying a voltage in which the flyback voltage is superposed on an input voltage through a rectifying element, the switching power supply comprising:

a transistor rectifying element, which includes a PNP type bipolar transistor, electrically coupled between the inductance element and an output terminal, for rectifying the input voltage;

a driving transistor, which includes an NPN type bipolar transistor, electrically coupled between a base of the transistor rectifying element and a low potential point such as ground, for controlling operation of said transistor rectifying element, said driving transistor receiving a supply of an ON and OFF control signal from a connection point of the transistor rectifying element and an output side of the inductance element;

a capacitor connected between a base of the driving transistor and the connection point of the transistor rectifying element and the inductance element, for coupling the control signal to the base of the driving transistor; and an impedance circuit connected between the base of the transistor rectifying element and an input side of the inductance element.

5. The switching power supply according to claim 4, wherein the impedance circuit consists of a resistor.

6. The switching power supply according to claim 4, wherein the impedance circuit consists of a series circuit of a resistor and a diode.

7. The switching power supply according to claim 4, further comprising a phase shift adjusting circuit connected in parallel to the impedance circuit.

8. The switching power supply according to claim 5, further comprising a phase shift adjusting circuit connected in parallel to the impedance circuit.

9. The switching power supply according to claim 6, further comprising a phase shift adjusting circuit connected in parallel to the impedance circuit.

* * * * *